Figure 5:
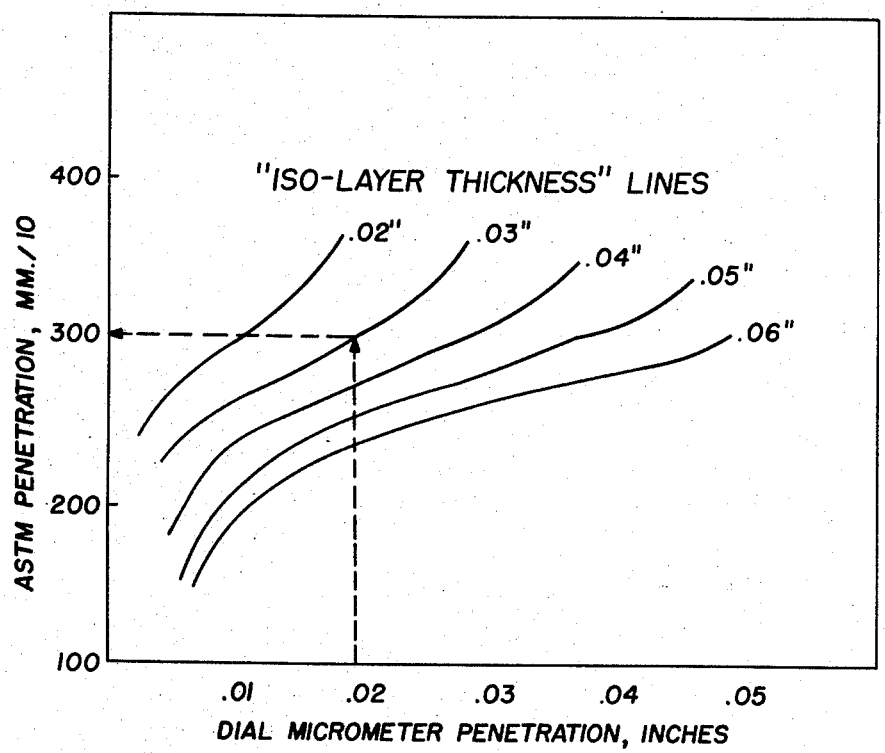

Nov. 24, 1959   R. O'HALLORAN ET AL   2,913,898
HARDNESS DETERMINATION FOR SEMI-SOLID MATERIALS
Filed June 6, 1955   2 Sheets-Sheet 1
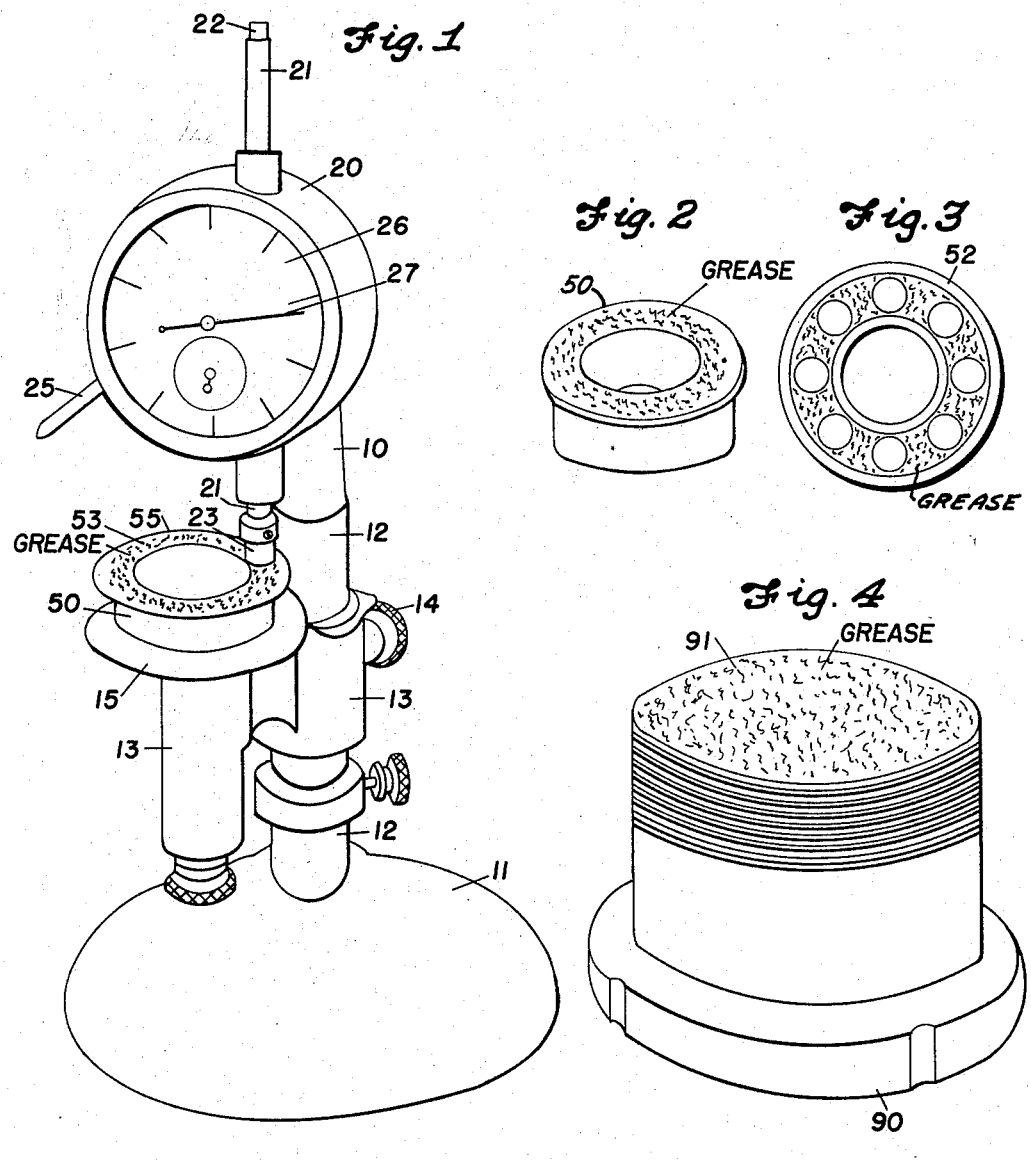
Rosemary O'Halloran
John J. Kolfenbach   Inventors
Small, Dunham + Thomas
By W. O. Heilman   Attorney

United States Patent Office 2,913,898
Patented Nov. 24, 1959

2,913,898
HARDNESS DETERMINATION FOR SEMI-SOLID MATERIALS

Rosemary O'Halloran, Union, and John J. Kolfenbach, North Plainfield, N.J., assignors to Esso Research and Engineering Company, a corporation of Delaware Application June 6, 1955, Serial No. 541,719
3 Claims. (Cl. 73—57)

This invention relates to a method and apparatus for determining the hardness of semi-solids. More particularly the invention relates to a novel method for determining the hardness of small samples of greases.

In many instances it is desirable to determine the consistency of semi-solid materials. Such determinations are employed, for example, in the manufacture of semi-solids as a means of process control, or in field determinations where it is desired to evaluate the performance of materials in service. Examples of such semi-solids include rust preventive formulations, waxes, asphalts, gels, petrolatum and particularly greases.

The consistency test universally used for greases is the penetration test adopted by the A.S.T.M. as a tentative standard method (A.S.T.M. No. D 217–44T). This test consists of measuring the depth of penetration of a sharp-pointed steel cone of fixed dimensions and weight, into a sample of the grease maintained at a temperature of 77° F. The depth penetrated in 5 seconds is registered on a scale in tenths of millimeters (mm./10), and an average of several such readings is taken as a measurement of the consistency. The standard A.S.T.M. penetration apparatus utilizes a sample cup which requires a 275 gram grease sample. A micropenetrometer, similar in design to the standard A.S.T.M. apparatus but smaller in size, is also used in grease work. This micropenetrometer requires a grease sample of about 5 grams.

Frequently it is desired to determine the hardness of a sample of grease which is considerably less than 5 grams. This situation arises, for example, when it is desired to determine the hardness of a sample of used grease from a bearing or from a particular section of a bearing where the sample amounts to as little as about 0.1 gram. Heretofore there was no method available for determining the hardness of such small samples.

A novel method has now been found for determining the hardness of semi-solids. The method of this invention may be employed with samples as small as about 0.1 gram. In certain instances the hardness of a film of semi-solid material on an object, such as a bearing, a panel, etc., may be determined directly thereon by the method of this invention when the film is about 0.01 to 0.1 inch in thickness. The method of this invention involves two measurements; namely (1) a measurement of the penetration of a weighted body into a film of the semi-solid material during a given period of time and (2) a measurement of the total film thickness at this point of penetration. It has been found that these two measurements can be correlated with the hardness determined by the aforementioned standard A.S.T.M. method.

The present invention will be more fully understood by reference to the drawings of which Figure 1 shows apparatus which may be employed to practice the method of this invention, Figure 2 is a greased bearing shield, Figure 3 is a bearing, Figure 4 is a grease filled cup of a standard A.S.T.M. penetration apparatus, and Figure 5 is a graph showing the correlation between the penetration into and the thickness of the sample film with the standard A.S.T.M. penetration (when utilizing the apparatus of Fig. 1).

Referring now to Fig. 1, reference character 10 designates a Randall-Stickney Inspector's Dial Bench Gauge (or dial micrometer) which is marketed by Randall-Stickney Co., Waltham, Massachusetts. This particular dial micrometer is well known in the plastics and rubber fields for measuring film thickness in units of 0.001 inch. In Fig. 1 a greased bearing shield 50 is shown in position in micrometer 10 for determining the hardness of grease 53 adhering to its upper surface 55 in accordance with this invention. Also shown separately is bearing shield 50 (Fig. 2) and bearing 52 (Fig. 3). Fig. 4 shows cup 90 of the standard A.S.T.M. penetration apparatus (not shown) which holds grease sample 91. Cup 90 is shown to provide a visual comparison of the sample size required for the standard A.S.T.M. penetration test as compared to the sample size required for the present invention.

Micrometer 10 is provided with a base 11 for supporting the apparatus and a vertically arranged stand 12 to which are attached the essential parts of micrometer 10. Sample support 13 is arranged on stand 12 and is vertically movable thereon. The vertical position of sample support 13 on stand 12 is adjusted by means of adjustor knob 14 which may be loosened to permit movement of sample support 13 in a vertical or horizontal direction and tightened against stand 12 to lock sample support 13 in a fixed position. Mounted on the top of stand 12 is dial 20 which indicates the amount of vertical movement of a vertically arranged plunger 21. Micrometer gauge 10 as purchased from the manufacturer is equipped with a 3-ounce weight (not shown) which is attached to the threaded upper end 22 of plunger 21. For the purposes of this invention, micrometer 10 is modified by removing this weight. Arranged at the lower end of plunger 21 is a blunt end presser foot 23. The bottom surface of presser foot 23 is flat and circular having a diameter of 0.25 inch. Plunger 21 and presser foot 23 weigh a total of 35 grams. Arm 25 is operated to raise and lower plunger 21 (and presser foot 23). When arm 25 is lowered, plunger 21 is raised; then when arm 25 is released, plunger 21 falls freely downward. The amount of vertical movement (in units of 0.001 inch) of plunger 21 (and presser foot 23) is registered on circular scale 26 by pointer 27 of dial 20.

The utilization of micrometer 10 to determine the hardness of a sample of grease may be carried out as follows: Arm 25 is depressed to its lowest position. This raises plunger 21 (and presser foot 23) to its uppermost position. Then the grease sample to be evaluated for hardness is placed on sample support 13. The grease sample may be spread out on base plate 15 of sample support 13 if desired, or if the grease is actually on a suitable body such as bearing shield 50, which has a flat surface 55, the body itself may be placed on base plate 15 of sample support 13 with the grease sample (which is to be tested) facing upwardly. The upper surface of base plate 15 is flat. It may be necessary in order to place the grease sample on base plate 15 and underneath presser foot 23, to loosen adjustor knob 14 to thereby lower sample support 13 (and base plate 15).

After the grease sample is placed on base plate 15 of sample support 13, the upper surface of the grease sample facing the bottom surface of presser foot 23 is leveled off to form a flat upper surface. Then sample support 13 is raised until the bottom surface of presser foot 23 just contacts the upper surface of the grease sample arranged on base plate 15. At this point, the testing apparatus is ready to make the two measurements required in practicing the method of this invention.

Arm 25 is then released to permit presser foot 23 to fall into the film of the grease sample. The amount of penetration during a given period of time is measured by noting the movement of pointer 27 of dial 20. Generally it has been found convenient to measure the penetration of presser foot 23 into the film of grease for a period of 2 seconds. After the above-described penetration has been measured, presser foot 23 is forced downward through the film by tapping upper end 22 of plunger 21 with the finger until it contacts the upper surface of bearing shield 50. In this way the thickness of the original film at the point of penetration may be measured. The thickness of the original film corresponds to the total change in the reading on dial 20 occurring between (1) the reading corresponding to the position of presser foot 23 when just contacting the upper surface of the original film prior to its release in free fall and (2) the reading corresponding to the position of presser foot 23 when the bottom of presser foot 23 contacts the upper surface of bearing shield 50. Of course if the grease sample had been placed on base plate 15 of sample support 13, the measurement of thickness would be carried out between the upper surface of the original grease film to the point where presser foot 23 contacts the upper surface of base plate 15.

The apparatus employed for determining the hardness of a semi-solid material in accordance with the present invention thus comprises a means for supporting a film of the semi-solid material, a blunt end weighted body provided with a bottom surface having a contour substantially identical to the upper surface of the film, a means for supporting the weighted body above the film, a means for adjusting the relative positions of the film and the bottom surface of the weighted body such that the bottom surface of the weighted body contacts the upper surface of the film, a means for releasing the weighted body in substantially free fall into the film, and means for measuring the distance of free fall of the weighted body into the film in a given period of time and for measuring the thickness of the original film. Although the invention has been specifically described utilizing a modified Randall-Stickney dial micrometer, it will be apparent that similar types of micrometers may be employed and further that numerous modifications may be made by those skilled in the art without departing from the spirit of the present invention. For example, various devices may be added to improve the sensitivity of the apparatus such as devices to smooth the top of the sample, slice it off to a predetermined thickness, etc. Furthermore, it will be understood that although the invention was described in connection with the measurement of the hardness or consistency of a grease, the invention is also applicable to other semi-solid materials such as rust preventive compositions, asphalts, gels, petrolatum, waxes and the like.

The present invention is particularly useful in determining the hardness or consistency of lubricating greases, particularly those greases having an A.S.T.M. penetration in the range of about 150 to 350 mm./10. Generally at least about 0.1 gram of a sample of the grease to be evaluated in the invention will be required. It will be apparent that there is no upper limit as to the amount of the sample required. The film of grease which is measured in this invention will generally be about 0.01 to 0.1 inch thick although if desired somewhat thinner or thicker films may be measured. It is preferred to determine the consistency of soft greases using relatively thin films and hard greases using relatively thick films.

For a particular instrument (such as the modified Randall-Stickney dial micrometer described above), it is possible to prepare a set of curves based on the two measurements made, that is the measurement of penetration into the film during a given period of time and the measurement of film thickness, which correlate with standard A.S.T.M. penetration. Such a set of curves is shown in Fig. 5. To prepare such a set of curves it is necessary to test a number of greases of different hardnesses utilizing various film thicknesses with each grease. This may conveniently be carried out by cutting back a given grease with successive amounts of a lubricating oil to give greases of diminishing hardness. For each grease it is necessary in developing the set of curves to determine the A.S.T.M. hardness of the grease by employing the standard A.S.T.M. penetration test, as well as to measure the penetration and thickness of a film of the grease in accordance with this invention. Several different film thicknesses for each grease should be evaluated in accordance with this invention in order to give a series of "iso-layer thickness" lines as shown in Fig. 5.

Once a standard set of curves is developed as in Fig. 5 for a particular apparatus they may be employed for subsequent determinations of hardness of grease samples of unknown hardness. (In this connection it will be noticed that the layer thickness of the unknown sample to be tested may be controlled by levelling it off to a predetermined depth corresponding to one of the "iso-layer thickness" lines on Fig. 5, or Fig. 5 may be interpolated to use film thickness values in between those shown in Fig. 5.) For example, assume that a sample of grease (of unknown hardness) is spread out evenly in a flat film on base plate 15 of sample support 13 in Fig. 1. Presser foot 23 is raised to its top position by pushing arm 25 downwardly. Then sample support 13 and base plate 15 are raised until the bottom surface of presser foot 23 contacts the upper surface of the grease film on base plate 15 of sample support 13. Then arm 25 is released permitting presser foot 23 to fall freely into the grease film for 2 seconds and the amount of fall or peneration during that period is determined by means of dial 20 to be 0.020 inch. (The penetration shown in Fig. 5 are based upon a free fall of 2 seconds). Then the thickness of the film is determined by pressing presser foot 23 through the remainder of the film by pushing downwardly on plunger 21 at top part 22 or by raising arm 25 upwardly. Assume that the film thickness was determined to be 0.030 inch. Then by employing Fig. 2 as indicated by the dotted lines thereon, it would be found that the grease sample evaluated had an A.S.T.M. penetration of about 300 mm./10. It is generally desirable to make several such determinations for each grease sample (as is conventional in most testing procedures). Preferably these determinations are made using different film thicknesses and the A.S.T.M. penetrations determined from Fig. 2 are then averaged for a final value.

It will be apparent that it is necessary to determine both the thickness of the film and the amount of penetration of the presser foot into the film in the method of this invention since the film thicknesses involved are very small (generally about 0.01 to 0.1 inch thick). A reading of merely the penetration of the presser foot into the film in a given period of time would not be sufficient to correlate with the standard A.S.T.M. penetration since the thickness of the film, particularly in the case of the thinner films, substantially affects the amount of penetration. For example, it will be seen from Fig. 5 that a sample of a grease of about 300 mm./10 (standard A.S.T.M. penetration) when using a film thickness of 0.030 inch will give 0.020 inch of penetration in 2 seconds, as will a sample of a grease having about 225 mm./10 (standard A.S.T.M. penetration) when using a film thickness of 0.060 inch.

The degree of penetration of the weighted body (presser foot) into the sample film will depend upon a number of factors in addition to the film thickness, such as (1) the weight of the body, (2) the area of the bottom surface of the body, (3) the time of free fall and (4) the hardness of the grease sample. As stated previously, the invention is particularly applicable to greases having A.S.T.M. penetrations in the range of about 150 to 350 mm./10, particularly when utilizing the modified Randall-Stickney dial micrometer. However, if desired, the instrument may be modified to evaluate either harder or softer greases by changing any of the other aforementioned factors. The amount of penetration will be greater for softer greases, heavier bodies, smaller bottom surface areas of the body, and longer times. It is preferred to employ weighted bodies which have flat and circular bottom surfaces. In such cases, bottom surface areas having diameters in the range of about 0.1 to 1.0 inch are useful and weighted bodies of about 10 to 100 grams are particularly useful. It will be understood that it is not necessary that the bottom surfaces of the weighted body be circular. Other shapes such as squares, rectangles, triangles, etc. may be employed if desired. Generally it is preferred that the time of free fall be at least about 1 second so as to be readily measurable. Times of about 2 to 5 seconds are useful but shorter or longer times may be employed if desired. In general, the above factors should be selected such that the penetration into the film for the given period of time is in the range of about 10 to 90% of the thickness of the film, and preferably in the range of about 20 to 80% of the film thickness. In this connection, it will be understood that the expression "film," as used in this specification, refers to the original sample prior to penetration. In general the invention will be employed utilizing a flat film of the sample grease and a flat bottom surface on the weighted body. However it will be understood that other systems may be used if desired. More specifically a curved film could be measured in this invention by using a weighted body having a bottom surface of substantially identical contour.

The method of this invention is particularly useful in determining the breakdown of greases in service in small bearings. In this work the method of this invention provides a means of measuring the hardness of small samples of grease directly on the shields of the bearing setup, or as scraped off localized areas in the bearing, such as the cage, separators, races, etc. The advantages of the method of this invention include the ability to measure the hardness of exceedingly small samples of greases and freedom from the undesirable "wall" effect of other penetrometers which use cups to hold the grease sample.

For a given test apparatus and a given set of testing conditions substantially identical penetrations will be obtained in the present test with all types of greases of a given standard A.S.T.M. penetration. In other words, the present invention is essentially independent of the type of grease tested, whether it be a simple soap grease, a mixed soap grease, a soap-salt thickened grease, a complex soap-salt grease, a grease thickened with an inorganic thickener, a grease containing extreme pressure agents, anti-oxidants, etc. It is not believed necessary to go into a more detailed description of greases or their preparation in this specification since these are well known by those skilled in the art. For example, the book "Lubricating Greases: Their Manufacture and Use" by Klemgard sets forth greases in detail.

The invention will be more fully understood by reference to the following examples. It is pointed out, however, that the examples are given for the purpose of illustration only and are not to be construed as limiting the scope of the present invention in any way.

EXAMPLE I

This example is directed to the procedure which was employed for obtaining data used in preparing Fig. 5. The data were obtained utilizing the micrometer shown in Fig. 1. Flat films of several different greases were formed individually on base plate 15 of micrometer 10 and measurements were made with micrometer 10 of the film thickness and the free fall penetration of presser foot 23 into the film during a period of 2 seconds. With each grease a number of different film thicknesses were employed. Also the standard A.S.T.M. penetration of each grease was determined using a standard A.S.T.M. penetrometer.

The following greases were among those utilized in obtaining data to prepare Fig. 5:

Grease A

This grease was a commercial bearing grease which contained 14 wt. percent of lithium soap (essentially 12-hydroxystearate, by analysis) based on total grease. This grease was selected for testing because its penetration is very resistant to change from working.

Greases A-1, A-2, A-3 and A-4

Grease A was cut back with successive amounts of an acid-treated Coastal mineral oil distillate (700 S.U.S./100° F., 50 V.I.) to prepare a series of four greases having successively increasing A.S.T.M. penetrations. These greases contained the following amounts of lithium hydroxy stearate soap:

| Grease: | Wt. percent soap |
|---|---|
| A-1 | 12.25 |
| A-2 | 10.50 |
| A-3 | 8.75 |
| A-4 | 7.00 |

Grease B

Grease B was selected because it was an extremely hard smooth grease. It contained 35 wt. percent sodium soap (based on total grease) of high molecular weight unsaturated fatty acids dispersed in an acid-treated (500 S.U.S./100° F., 60 V.I.) mineral oil.

Shown below, in Table I, are the results of the aforedescribed experiments which were carried out to obtain data used in the preparation of Fig. 5

TABLE I—DATA EMPLOYED IN PREPARING FIG. 5

| Grease Tested | | Standard A.S.T.M. Penetration (mm./10)[1] | Measurements Made With Micrometer 10 | |
|---|---|---|---|---|
| Type | Wt. Percent Soap | | Film Thickness (0.001 inch) | (Penetration)/Percent (Film Thickness) |
| A | 14.00 | 215 | 56 | 21 |
| | | | 44 | 16 |
| | | | 34 | 7 |
| | | | 36 | 12 |
| | | | 27 | 6 |
| | | | 27 | 13 |
| | | | 24 | 8 |
| | | | 22 | 7 |
| | | | 20 | 6 |
| A-1 | 12.25 | 250 | 45 | 35 |
| | | | 42 | 26 |
| | | | 35 | 30 |
| | | | 32 | 28 |
| | | | 27 | 22 |
| | | | 24 | 16 |
| | | | 20 | 15 |
| | | | 17 | 12 |
| A-2 | 10.50 | 285 | 59 | 72 |
| | | | 53 | 51 |
| | | | 39 | 59 |
| | | | 32 | 50 |
| | | | 30 | 57 |
| | | | 22 | 42 |
| | | | 20 | 43 |
| | | | 20 | 38 |
| | | | 16 | 31 |
| | | | 16 | 25 |
| | | | 13 | 31 |
| A-3 | 8.75 | 315 | 48 | 83 |
| | | | 45 | 80 |
| | | | 38 | 77 |
| | | | 38 | 77 |
| | | | 37 | 82 |
| | | | 33 | 75 |
| | | | 30 | 76 |
| | | | 30 | 63 |
| | | | 24 | 71 |
| | | | 24 | 69 |
| | | | 19 | 53 |
| | | | 16 | 64 |
| | | | 16 | 56 |
| | | | 15 | 53 |
| | | | 13 | 47 |
| | | | 12 | 58 |
| | | | 48 | 93 |
| | | | 26 | 86 |
| A-4 | 7.00 | 350 | 22 | 86 |
| | | | 16 | 81 |
| | | | 16 | 75 |
| | | | 10 | 70 |
| | | | 36 | 3 |
| B | 35.00 | 147 | 47 | 8 |
| | | | 51 | 10 |

[1] Determined using a standard A.S.T.M. penetrometer at 77° F.

EXAMPLE II

The A.S.T.M. penetrations of a number of different types of grease were then determined by the following two methods: (1) The A.S.T.M. penetration was determined utilizing a standard A.S.T.M. penetrometer and (2) the A.S.T.M. penetration was determined by measuring (A) grease film thickness (in the range of 0.01 to 0.10 inch) and (B) amount of penetration into said film of presser foot 23 (in 2 seconds) with micrometer 10, these two measurements being applied to Fig. 5 to thereby determine A.S.T.M. penetration shown in Fig. 5. Several such determinations were made by each of the two methods with each type of grease. The following greases were evaluated:

Grease C

This grease contained 16% of mixed lithium and calcium soaps of cottonseed fatty acids dispersed in an acid extracted Coastal distillate (900 S.U.S./100° F., 50 V.I.).

Grease D

This grease contained 12% of mixed lithium and calcium soaps of distilled animal fatty acids dispersed in an acid extracted Coastal distillate (900 S.U.S./100° F., 50 V.I.).

Grease E

This grease contained about 8% of the lithium and calcium soaps of cottonseed fatty acids dispersed in a crude West Texas distillate of 70 S.U.S./210° F., 90 V.I. This grease contained minor amounts of lead naphthenate and sulfurized sperm oil extreme pressure additives.

Grease F

This grease contained 21% sodium soaps of higher molecular weight fatty acids prepared at high temperatures in the presence of a 55 S.U.S./210° F., 45 V.I. plus a 65/210° F., 100 V.I. mineral oil mixture, subsequently cooled down and homogenized.

Grease G

This grease contained about 18% of the sodium and calcium soaps of high molecular weight saturated fish oil fatty acids dispersed in a mineral oil of 47 S.U.S./210° F. and 75 V.I.

Grease H

This grease was prepared by cutting back Grease A with a mineral oil to give a grease containing 11.4 wt. percent of soap.

Grease I

This grease was prepared by cutting back Grease A with a mineral oil to give a grease containing 9.6 wt. percent of soap.

The following A.S.T.M. penetrations were determined for Greases C to I utilizing the aforementioned two methods of determination:

TABLE II.—COMPARISON OF PENETRATION METHODS

| Grease Tested | A.S.T.M. Penetrations | |
|---|---|---|
| | Determined with Standard A.S.T.M. Penetrometer | Determined with Micrometer 10 using Fig. 5 |
| C | 280 | 291 |
| D | 291 | 300 |
| E | 330 | 335 |
| F | 331 | 337 |
| G | 311 | 320 |
| H | 260 | 263 |
| I | 300 | 295 |

It will be noted that above that the A.S.T.M. penetrations determined by the method of this invention differed by only about 3 to 11 units (mm./10) from the A.S.T.M. penetrations obtained with the standard A.S.T.M. penetrometer. This is an excellent correlation since the standard deviation in the determination of penetration with a standard A.S.T.M. penetrometer is about 5 mm./10 for intralaboratory work, and about 15 mm./10 for duplicates run in different laboratories. The fact that most of the deviations shown in Table II are in the positive direction (from the standard A.S.T.M. penetrations) reflects the small amount of working done on the grease during the preparation of the sample in the method of this invention. This difference in penetrations would not exist when measuring used, worked down, samples of grease, which samples are in general those which are most frequently to be tested in accordance with this invention.

What is claimed is:

1. A method of determining the hardness of a semi-solid material which comprises placing a small sample film, having a thickness in the range of about 0.01 to 0.1 inch, of said material on a flat supporting surface, penetrating said film with a flat bottom weighted body for a predetermined period of time whereby a penetration rate is obtained, measuring the thickness of said film by continuing said penetrating until said body has passed entirely through said film, and establishing the standard A.S.T.M. penetration for said semi-solid material responsive to a means displaying the standard A.S.T.M. penetration versus the penetration rate of said body into a film of said material with thickness of sample films as parameters.

2. A method according to claim 1 wherein said semi-solid material is a grease.

3. A method for determining the hardness of a grease having an A.S.T.M. penetration in the range of about 150 to 350 mm./10 with a relatively small sample thereof weighing at least about 0.1 gram which comprises forming a film of said grease having a thickness in the range of about 0.01 to 0.1 inch, measuring the penetration of a blunt-end weighted body downwardly into said film from the upper surface thereof during a given period of time, said penetration amounting to about 20 to 80% of the thickness of said film, measuring the thickness of said film at the point of said penetration and establishing the standard A.S.T.M. penetration responsive to a means displaying the standard A.S.T.M. penetration versus the penetration rate of said body into a film of said material with thickness of sample films as parameters.

References Cited in the file of this patent

UNITED STATES PATENTS

| | | |
|---|---|---|
| 494,974 | Bowen | Apr. 4, 1893 |
| 1,225,438 | Howard | May 8, 1917 |
| 1,470,806 | Burke | Oct. 16, 1923 |
| 1,540,979 | Bloom | June 9, 1925 |
| 1,565,502 | Rodler | Dec. 15, 1925 |

FOREIGN PATENTS

| | | |
|---|---|---|
| 16,997 | Great Britain | May 2, 1912 |